United States Patent [19]
Ødegård

[11] Patent Number: 5,862,688
[45] Date of Patent: Jan. 26, 1999

[54] LOCKING DEVICE

[76] Inventor: Kjell Otto Ødegård, N-3525 Hallingby, Norway

[21] Appl. No.: 860,360

[22] PCT Filed: Dec. 4, 1995

[86] PCT No.: PCT/NO95/00222

§ 371 Date: Jun. 2, 1997

§ 102(e) Date: Jun. 2, 1997

[87] PCT Pub. No.: WO96/17755

PCT Pub. Date: Jun. 13, 1996

[30] Foreign Application Priority Data

Dec. 5, 1994 [NO] Norway ................................. 944683

[51] Int. Cl.$^6$ .................................................. E05B 73/00
[52] U.S. Cl. ................................ 70/19; 70/226; 188/32
[58] Field of Search ............................. 70/19, 225, 226, 70/237, 259, 260, 14, 18; 188/32

[56] References Cited

U.S. PATENT DOCUMENTS

| | | | |
|---|---|---|---|
| 337,183 | 3/1886 | Merrill | 70/226 |
| 596,237 | 12/1897 | Damon | 70/18 |
| 770,510 | 9/1904 | Stullken | 188/32 |
| 1,098,103 | 5/1914 | Freschl | 70/19 |
| 1,132,486 | 3/1915 | Oster | 70/19 |
| 1,508,547 | 9/1924 | Gentle et al. . | |
| 1,635,228 | 7/1927 | Sokolov | 70/19 |
| 1,800,708 | 4/1931 | Wartian | 70/260 |
| 1,819,813 | 8/1931 | Ellenberger . | |
| 3,844,146 | 10/1974 | Fouces et al. . | |
| 3,855,825 | 12/1974 | Pickard | 70/226 |
| 4,013,145 | 3/1977 | Mumm | 188/32 |
| 4,068,504 | 1/1978 | Pickard | 70/226 |
| 4,441,586 | 4/1984 | Bernier | 70/19 |
| 5,137,121 | 8/1992 | Leonard | 70/226 |
| 5,179,849 | 1/1993 | Wang | 70/226 |
| 5,247,815 | 9/1993 | Caldwell | 70/18 |
| 5,271,636 | 12/1993 | Mohrman et al. | 70/226 |
| 5,315,848 | 5/1994 | Beyer . | |
| 5,375,442 | 12/1994 | Hammer | 70/14 |

FOREIGN PATENT DOCUMENTS

| | | |
|---|---|---|
| 1467816 | 3/1977 | United Kingdom . |
| 2152890 | 8/1985 | United Kingdom . |
| 2180806 | 4/1987 | United Kingdom . |
| 86/05150 | 9/1986 | WIPO . |

Primary Examiner—Darnell M. Boucher
Attorney, Agent, or Firm—Abelman, Frayne & Schwab

[57] ABSTRACT

A locking device (1), especially suitable for clamping onto motor vehicle wheels. It consists of a generally elongate lock case (2) and a first and second grip arm (3, 4), each connected to one end of the lock case. The grip arms (3, 4) are designed to grip from opposite sides at least partly around the edge of the wheel so that the lock case (2) lies essentially parallel to the axis of the wheel. The first grip claw (4) is slideably received in the lock case (2). The novelty of the invention resides in that in the lock case (2) there is provided a toothed bar (11) connected at one end to one of the grip claws (3), which, when the lock is in a locked state, engages with a check pawl (14). The check pawl (14) is operatively connected to the second grip claw (4). The lock case may also be equipped with a spring (17) for drawing together the two grip claws (3, 4).

9 Claims, 5 Drawing Sheets

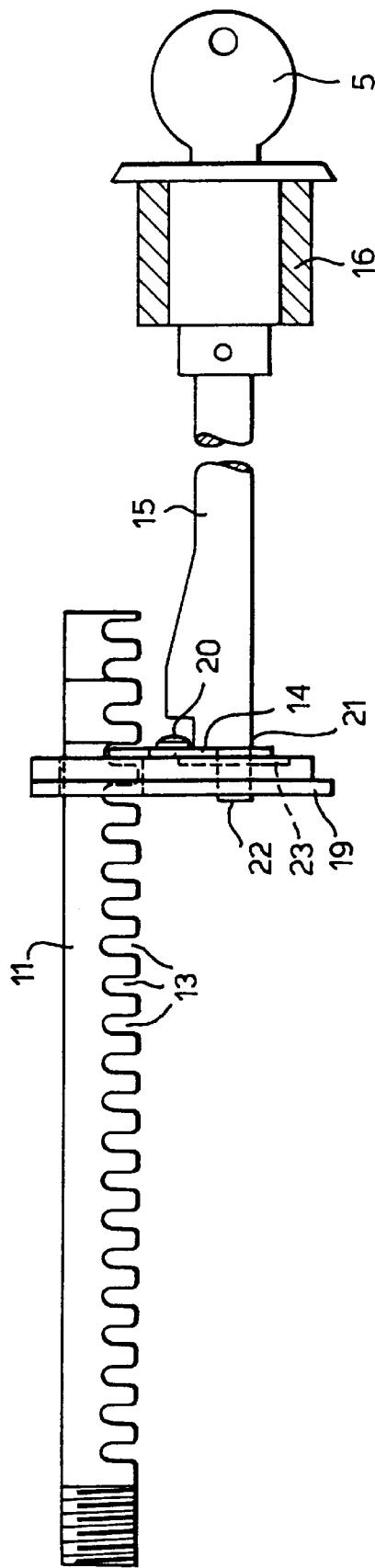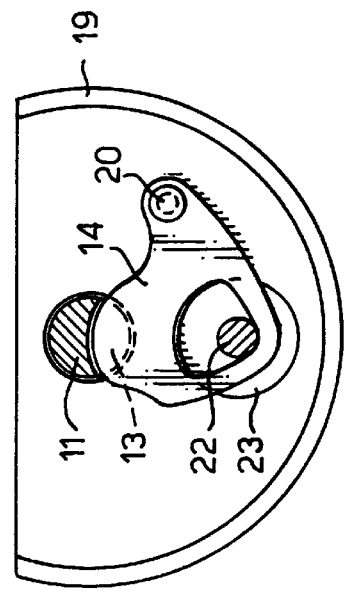

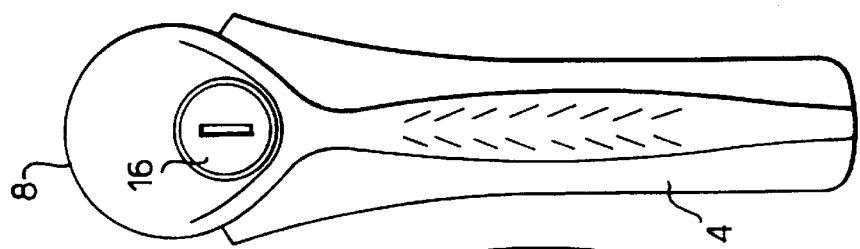
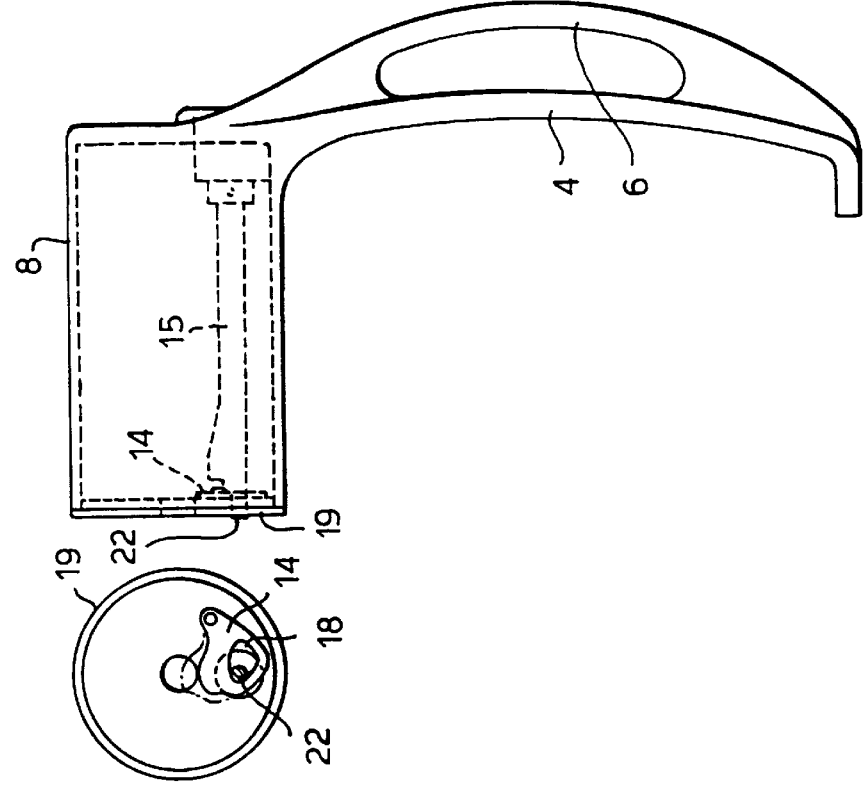
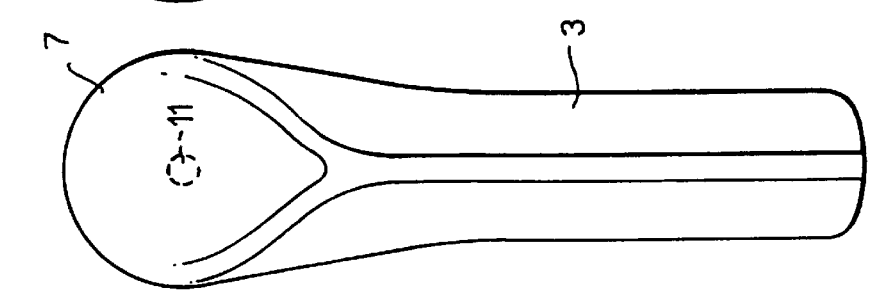
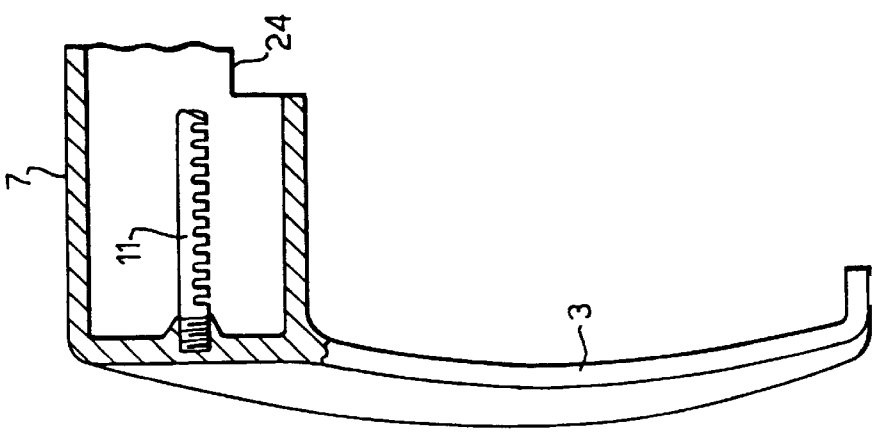

LOCKING DEVICE

The present invention relates to a locking device which is especially suitable for clamping onto a wheel in accordance with the in claims.

A locking device of this kind is highly suitable for locking around a wheel. It can thus be used as a theft-proof device as it will not be possible to drive a car with a locking device of this kind mounted on one of the wheels. It is also suitable as a so-called "wheel clamp" used by traffic wardens to prevent an incorrectly parked car from being moved until the parking charge has been paid.

A device of this kind is known from U.S. Pat. No. 1,819,813, which teaches a locking device consisting of two halves, wherein one of the halves is moveable in relation to the other by turning a threaded bolt. To turn the bolt, which is enclosed in a housing, there is provided a hexagonal head which is in engagement with one end of the bolt. The hexagonal head is displaceable in the longitudinal direction into the housing, so that when it is in its innermost position it is not accessible from outside for turning the bolt. The hexagonal head is lockable in this position.

This device is extremely troublesome to manipulate. To adjust the gap between the grip claws, one must turn the threaded bolt, which thus screws the grip claws towards or away from one another. To do this, one must use a suitable tool designed to engage with the hexagonal head. Putting the locking device on and taking it off the wheel therefore takes an unnecessarily long time. This may lead to the locking device being left in the car instead of being used.

U.S. Pat. No. 1,508,547 makes known a locking device for the same purpose, which consists of two halves hinged to one another.

This device is suitable for one wheel dimension only, as the space between the two halves in the locked position is fixed. It is true that the device is easier to use than the aforementioned device, but one has to be extremely painstaking when putting the device on so as to ensure that it is in the right position. Moreover, both this and the aforementioned locking device require two-handed manipulation.

The object of the present invention is to provide a locking device, preferably for mounting on a wheel, which is far easier to manipulate than the previously known locking devices, and which can be used for any wheel dimension within a very large range.

This is achieved by the features which are disclosed below. By means of the device according to the invention, the grip claws can be pulled apart from one another by hand when the device is not locked. This can be done in a very simple manner in that one of the grip claws is placed behind the wheel and the other claw is pulled out and placed on the other side of the wheel. The device is now placed about the edge of the wheel, and the grip claws can subsequently be thrust together, preferably by means of a tension spring. The locking device is then locked in this position. The locking position can be adjusted almost steplessly, which means that the locking device is able to cover all wheel dimensions within the minimum space between the grip claws and the maximum lockable space.

The invention will be described in more detail below with reference to the accompanying figures, wherein:

FIG. 5 illustrates a second embodiment of the locking system;

FIG. 6 is a plane view of the locking system according to FIG. 5; and

FIG. 7A is a left-hand end view of the outer member 7 of the locking system of FIG. 5.

FIG. 7B is a front view of the outer member 7 of FIG. 7A partially broken away, and in partial cross-section.

FIG. 7C is a left-hand end view of the inner member 8 of the locking system of FIG. 5.

FIG. 7D is a front view of the inner member 8 of FIG. 7C.

FIG. 7E is a right-hand end view of the inner member 8 of FIGS. 7C and 7D.

Figure 1:
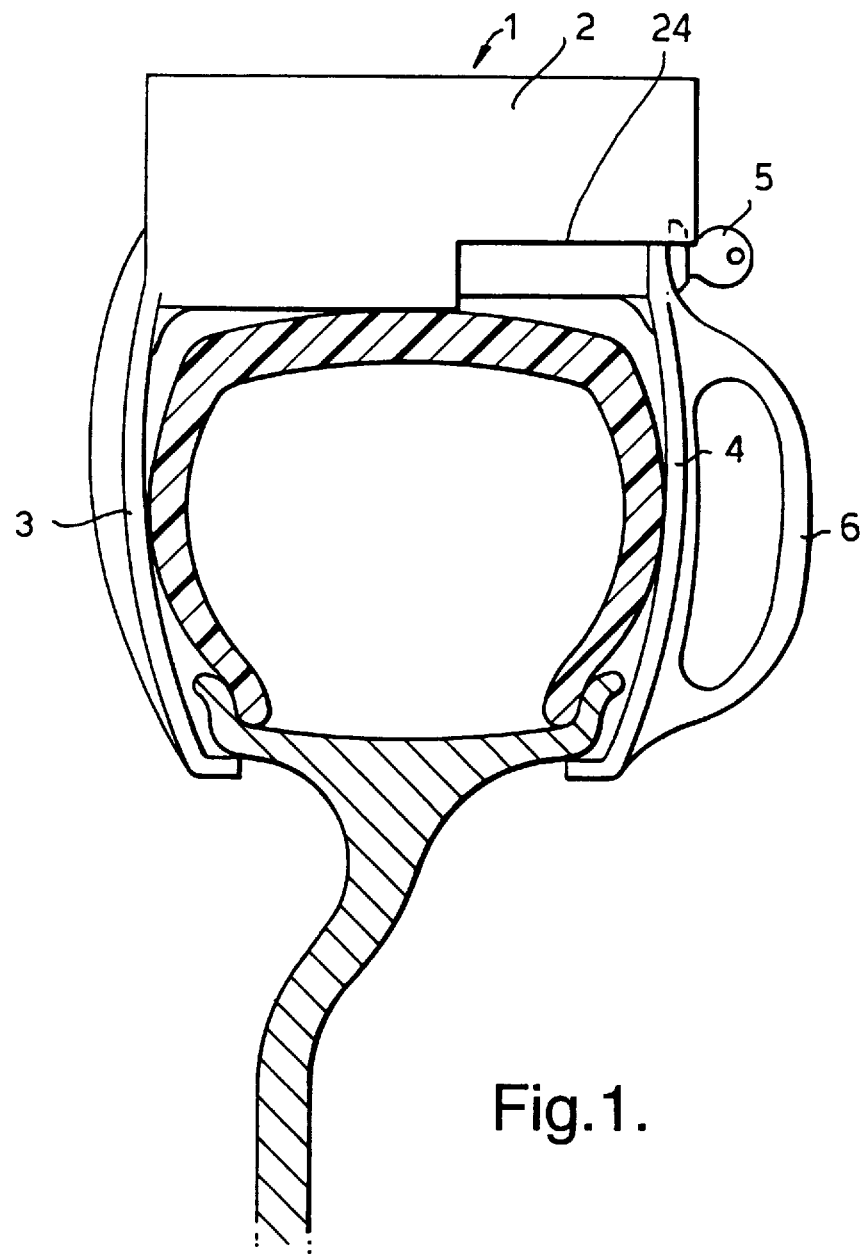
FIG. 1 illustrates the locking device mounted on a car wheel.
Figure 2:
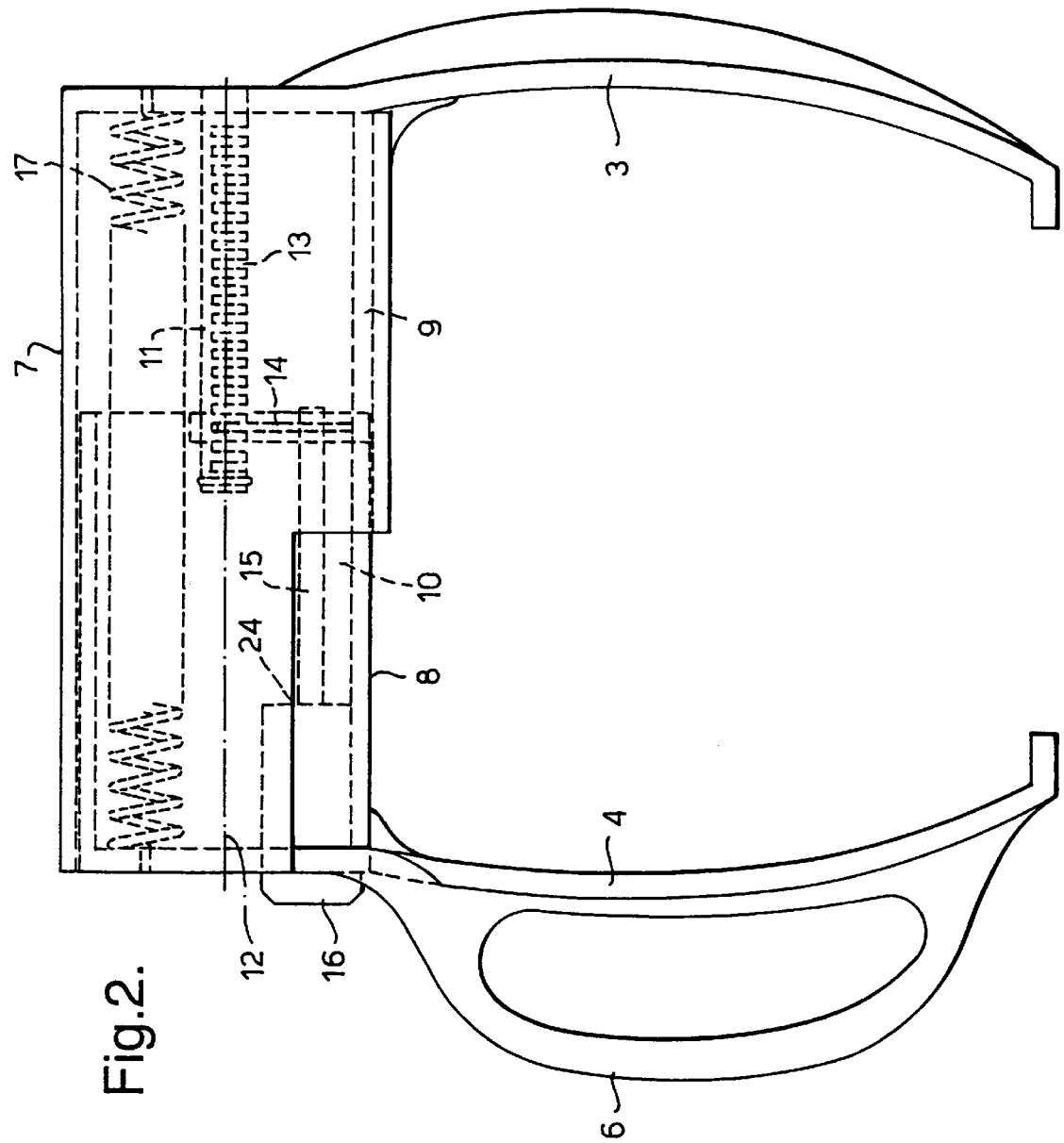
FIG. 2 is a plane view of the locking device, with a first embodiment of the internal details of the locking system indicated.
Figure 3:
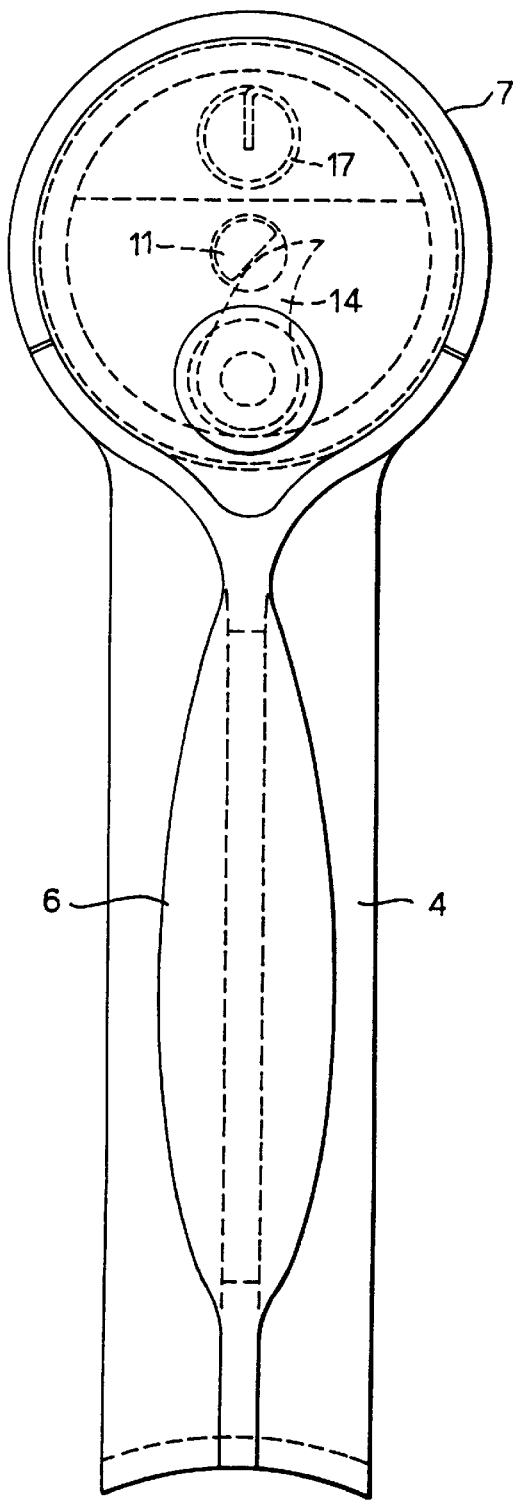
FIG. 3 is an end view of the locking device according to FIG. 2, also here with the internal details indicated.
Figure 4:
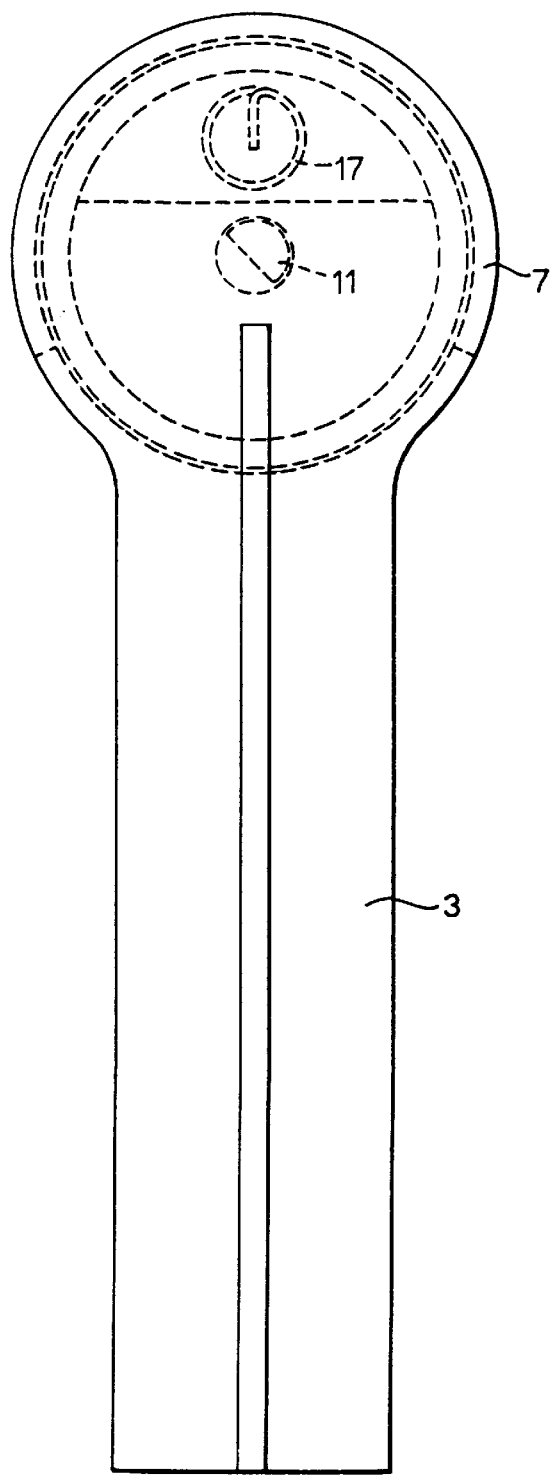
FIG. 4 shows the locking device seen from the opposite side to that illustrated in FIG. 3.

FIGS. 1 to 4 show a locking device, generally designated by means of reference numeral 1. The locking device consists of a generally elongate lock case 2 and two grip claws 3 and 4, respectively. The locking device can be locked with the aid of a key 5. It may be equipped with a carrying handle 6, which also serves to make it easier to put on the locking device 1. The grip claw 4 is slideably received in the lock case 2 in a way that is described immediately below.

The lock case 2 consists of an outer member 7 and an inner member 8. The outer member 7 is connected to the grip claw 3 at one end thereof. The inner member 8 is connected to the grip claw 4 in the same way. The members 7 and 8 are preferably generally cylindrical with cylindrical bores 9 and 10. The inner member 8 is received in the bore 9 of the outer member. The cylinder bores 9 and 10 are concentric and are also in concentric relation with a toothed bar 11, which thus is located along the common central axis 12 of the cylinder bores. The members 7 and 8 are capable of being turned relative to one another when the claw 4 is in its outermost position. The claw 4 may be equipped at the outer end thereof with a stop which engages with the end edge of the outer member 7 when the claw is swung outward relative to the member 7. To guide the claw 4, the outer member 7 is equipped with a guide edge 24. This guide edge prevents the outward swinging of the claw 4 when this is in its innermost position and intermediate positions.

Toothed grooves 13 are formed on the toothed bar 11. The grooves 13 are designed to engage with a check pawl 14, which is operatively connected to the inner member 8. To operate the check pawl, there is a locking bar 15 which extends from the check pawl to a lock cylinder 16 at the outer end of the inner member 8. The lock cylinder 16 can be operated by means of a key 5.

To make it easier to draw the locking device together around the wheel, a spring 17 is provided in the lock case 2, which is connected to the outer ends of members 7 and 8, respectively.

A preferred embodiment of the locking system is illustrated in FIGS. 5 to 7 for the reciprocal locking of members 7 and 8. Here, the check pawl 14 has a different design. It is equipped with a hole 18 through which the locking bar 15 extends. Furthermore, the inner member 8 is equipped with a cap 19 at its inner end. The check pawl 14 is pivotally connected to this cap by means of, for example, a stud 20. By designing the hole 18 and the part 21 of the locking bar which acts against the inside thereof in a complementary fashion, the turning of the locking bar 15 can be made to turn the check pawl 14 in towards the toothed bar 11 and into one of the grooves 13. This may, for example, be achieved in that the locking bar 15 is equipped with an eccentric at part 21.

With this embodiment, a more powerful locking effect between the toothed bar 13 and the pawl 14 is achieved, in that the forces which are transferred to the pawl 14 are taken up on the inside of the cap 19. Improved guiding of the locking bar 15, which is mounted in a hole 22 in the cap 19, is also obtained. Part 21 may also be supported by a recess 23 around the hole 22.

Although the cap 19 in FIG. 6 is shown as generally crescent-shaped in FIG. 6, it may, of course, be circular in shape with a hole for the spring 17. The cap 19 is fixed on the member 8 by means of, for example, set screws, an adhesive or a weld. The toothed bar 11 is received preferably in a threaded hole in the member 7. It may be glued into place here to ensure that it does not become detached over time. The spring 17 is mounted preferably in that the end portions which project straight out along the longitudinal axis of the spring are inserted through holes in the end walls of respective members 7 and 8. The end portions are thus bent and may optionally be placed in grooves on the outside of the members 7 and 8. The grooves containing the end portions may optionally be covered with a plate or quite simply a label, as the loosening of the spring will be of no significance whatsoever for the locking of the locking device.

The toothed bar and check pawl may, of course, also be mounted in the opposite way, i.e., that the toothed bar may be mounted to a fixed connection to member 8 and the pawl to a fixed connection to member 7. The locking device is not limited only to use for locking around wheels, but can, of course, be used for locking all kinds of articles. For example, a bicycle may well be locked to a post by means of the present invention. The locking device is preferably made primarily of light metal, such as magnesium, thereby making it even easier to handle. Because of its low weight, it may also even be put in the glove compartment of some cars. Its low weight and modest dimensions, make for a more extended use of the locking device as a "wheel clamp" in cases of parking offences.

I claim:

1. A locking device (1), especially suitable for clamping onto a wheel having an outer edge and a wheel axis, the wheel being operatively coupled to a vehicle, the locking device (1) comprising a generally elongate lock case (2) having a longitudinal axis and comprising an inner member (8) and an outer hollow member (7), said inner member (8) being connected to a first grip claw and said outer member (7) being connected to a second grip claw (3), which grip claws (3,4) are designed to grip from opposite sides at least partly around the outer edge of the wheel, the lock case (2) being adapted to lie essentially parallel to the axis of the wheel, said first grip claw (4) being slideably received in the lock case (2), a toothed bar (11) being provided in said lock case (2), said toothed bar (11) being connected at one end to the second grip claw (3), said toothed bar (11) engaging with a check pawl (14) when the locking device (1) is in a locked state, said check pawl (14) being operatively connected to the first grip claw (4), the inner member (8) being capable of being turned relative to the outer member (7) about an axis essentially parallel to the longitudinal axis of the lock case (2), whereby the first grip claw (4) can be swung outward sideways relative to the second grip claw (3) to facilitate placing the locking device on the wheel, and a tension spring (17), said spring (17) having a first end and a second end, said first end being operatively connected to a closed end of the outer member (7) and the second end being operatively connected to a closed end of the inner member (8), said spring (17) having a longitudinal axis between the first and second ends substantially perpendicular to the closed end of the outer member (7) and to the closed end of the inner member (8).

2. A locking device as disclosed in claim 1, wherein the inner member (8) is hollow in order to provide space for the toothed bar (11), and the check pawl (14).

3. A locking device as disclosed in claim 1, wherein the check pawl (14) is operatively connected to a locking bar (15), the locking bar (15) extending from a lock cylinder (16), the lock cylinder (16) being mounted in the closed end of either the outer member (7) or the inner member (8).

4. A locking device as disclosed in claim 1, wherein the check pawl (14) is pivotally connected to the inner member (8).

5. A locking device as disclosed in claim 1, wherein the outer member (7) has a substantially cylindrical bore (9) and the inner member (8) has a substantially cylindrical exterior, said cylindrical exterior being concentric with the bore (9) of the outer member (7), and the toothed bar (11) is placed along a common centre axis (12) of the outer member (7) and the inner member (8).

6. A locking device as disclosed in claim 1, wherein an end of the inner member (8) opposite the closed end is equipped with a cap (19), the check pawl (14) is pivotally affixed to an inside of the cap (19), the check pawl (14) is equipped with a hole (18) through which hole (18) the locking bar (15) extends, and the hole (18) in the check pawl (14) and the locking bar (15) are designed in a complementary fashion so that turning the locking bar (15) causes the check pawl (14) to move in and out of engagement with the toothed bar (11).

7. A locking device as disclosed in claim 6, wherein the locking bar (15) extends into a recess (22,23) in the cap (19), said recess (22,23) being adapted for guiding the locking bar (15).

8. A locking device as disclosed in claim 1, wherein the spring (17) at the second end is connected to an inside of the closed end of the inner member (8) and at the first end is connected to an inside of the closed end of the outer member (7).

9. A locking device as disclosed in claim 1, wherein the first grip claw (4) is equipped with at least one stop member at a connection between the first grip claw (4) and the inner member (8), said stop member engaging with a free end of the outer member (7) when the first grip claw (4) is swung out sideways.

* * * * *